Oct. 30, 1923.
W. A. SCHMIDT
1,472,231
MEANS FOR SEPARATING SUSPENDED PARTICLES FROM GASES
Filed Nov. 14, 1918     2 Sheets-Sheet 1
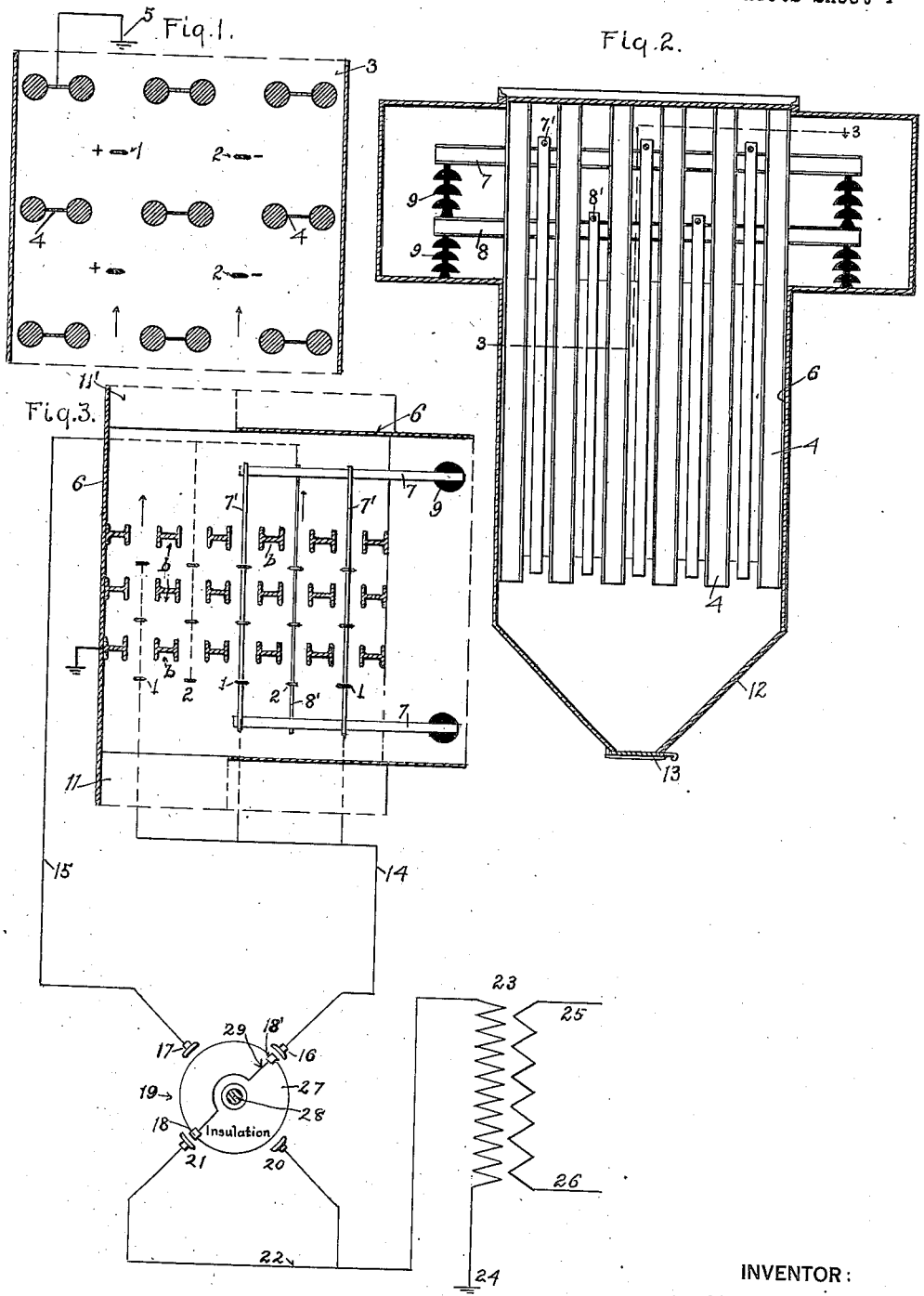
INVENTOR:
Walter A. Schmidt
BY Arthur P. Knight
ATTORNEY Oct. 30, 1923.

W. A. SCHMIDT 1,472,231

MEANS FOR SEPARATING SUSPENDED PARTICLES FROM GASES

Filed Nov. 14, 1918    2 Sheets-Sheet 2

INVENTOR
Walter A. Schmidt
BY Arthur P. Knight
ATTORNEY

Patented Oct. 30, 1923.

1,472,231

UNITED STATES PATENT OFFICE.

WALTER A. SCHMIDT, OF LOS ANGELES, CALIFORNIA, ASSIGNOR TO INTERNATIONAL PRECIPITATION COMPANY, OF LOS ANGELES, CALIFORNIA, A CORPORATION OF CALIFORNIA.

MEANS FOR SEPARATING SUSPENDED PARTICLES FROM GASES.

Application filed November 14, 1918. Serial No. 262,467.

*To all whom it may concern:*

Be it known that I, WALTER A. SCHMIDT, a citizen of the United States, residing at Los Angeles, in the county of Los Angeles and State of California, have invented a new and useful Means for Separating Suspended Particles from Gases, of which the following is a specification.

This invention relates to the separation of suspended particles from gases, primarily by electrical action, and the main object of the invention is to provide for such separation in such manner as to obviate certain objectionable characteristics prevalent in the apparatus heretofore used for said purpose. In the removal of suspended particles from gases by electric means, it has been found that a unidirectional electric field and a unidirectional electric discharge are essential for effective operation. In practice, the unidirectional electric field is established by the use of any convenient electrical generating apparatus, as, for example, by rectification of high potential alternating current, by means of mechanical rectifier or otherwise. The maintenance of unidirectional discharge within the percipitation apparatus has usually been accomplished by making the electrodes of such configuration that the electric field intensity at one electrode, usually called the "discharge electrode", is relatively very high as compared with the electric field intensity at or near the opposing electrode, which is usually called the "collecting electrode", and by this means ionization of the gases is restricted to the region adajcent to the discharge electrode. In the operation of such apparatus, it has been found that when the current flow is not smooth or essentially uniform, as in the cases when heavy electrical oscillations or surges occur in the circuit, resulting, for example, from the use of mechanical rectifiers, then the efficiency of precipitation decreases, and, under certain conditions, the precipitation of suspended particles gives way to the agglomeration of these particles into larger aggregates or flakes.

It has also been found that by reason of the accumulation of precipitated material on the collecting electrodes there is often serious interference with the efficiency of precipitation, particularly where the material to be collected is in the nature of fume and especially when this material is of a non-conducting nature, such precipitated material constitutes a discontinuous dialectric. In such case, there is a tendency to accumulation of a greater or less charge upon the deposit, resulting in a back discharge from the deposit on the collecting electrode. This causes a decrease in the efficiency of percipitation by reason of the tendency of such back discharge from the collecting electrode to produce reverse charges upon the suspended particles and causing movement thereof away from the collecting electrode. Furthermore, such discharge from the collecting electrode is generally accompanied by more or less breaking down of the dialectric strength of the gaseous medium between the electrodes, resulting in reduction of the potential difference that can be maintained between the electrodes and corresponding reduction of the precipitating action.

In my present invention, by means of the process herein described, I am enabled not only to avoid the interference with successful operation, resulting from the formation of discontinuous non-conducting deposits, but actually to use beneficially, the phenomenon outlined above under the discussion of adverse conditions established when such deposits are formed upon the solid collecting electrode.

In order to accomplish this, I do away with the collecting electrode entirely, and instead of precipitating the suspended particles upon an electrode, I cause these particles to move together and agglomerate with each other, and then settle out of the advancing gas stream. In order to accomplish this, I used two independent series of discharge elements, which can be made of any convenient material or configuration. The discharge elements of one series are placed in electrical opposition to the discharge elements of the other series, the two discharge electrodes being in opposition, so that the discharges proceed toward each other. By charging one series of electrodes positively, the other negatively, or by maintaining them at a suitable high potential difference, I am enabled to charge the particles adjacent to the negative electrode, negatively, and those adjacent to the positive electrode, positively. Under the influence of the electrostatic field existing between these electrodes, these particles will then be made to proceed toward each other, and by having the system properly adjusted, the particles can be made to come together in a zone intermediate between the negative and positive electrodes, and there agglomerate or coalesce with each other.

From the viewpoint of the present art of purification of gases by electric means, these particles are caused to precipitate on a non-conducting material electrode, but, in reality, they are made to coalesce into larger drops or to agglomerate and build to such sizes or masses in the form of flakes, so as to enable them to settle out of the gases under the action of gravity. In certain cases it will be convenient to allow these flakes or agglomerates to attach themselves to solid members, and then be shaken, or otherwise removed, from these members at convenient intervals, or in the case of liquid material to drain from same.

In practice, I prefer to place certain obstructions or baffles in the advancing path of the gases, so as to form relatively dead gas pockets or quiescent zones in which the fume particles may further agglomerate and in which they can settle without being subjected to the effect of a heavy draft, which would tend to carry the agglomerated flakes out of the gas-treating chamber. In practice, I prefer to make these obstructions of non-conducting material, such as not to interfere unduly with the configuration of the electric field between the opposing discharge members, each part of the obstruction taking on a space charge in electrical equilibrium with the gas and electric field immediately adjacent thereto. Under certain conditions, however, these obstructions may, in whole or in part, be made of conducting material.

The accompanying drawings illustrate an apparatus suitable for carrying out my invention, and referring thereto:

Fig. 1 is a horizontal section of an apparatus adapted for causing agglomeration of the suspended particles from the gas, said apparatus being shown diagrammatically.

Fig. 2 is a vertical section of an apparatus constituting an embodiment of my invention.

Fig. 3 is a horizontal section on line 3—3 in Fig. 2 showing also the connections to the electrical current supply means.

Figure 4:
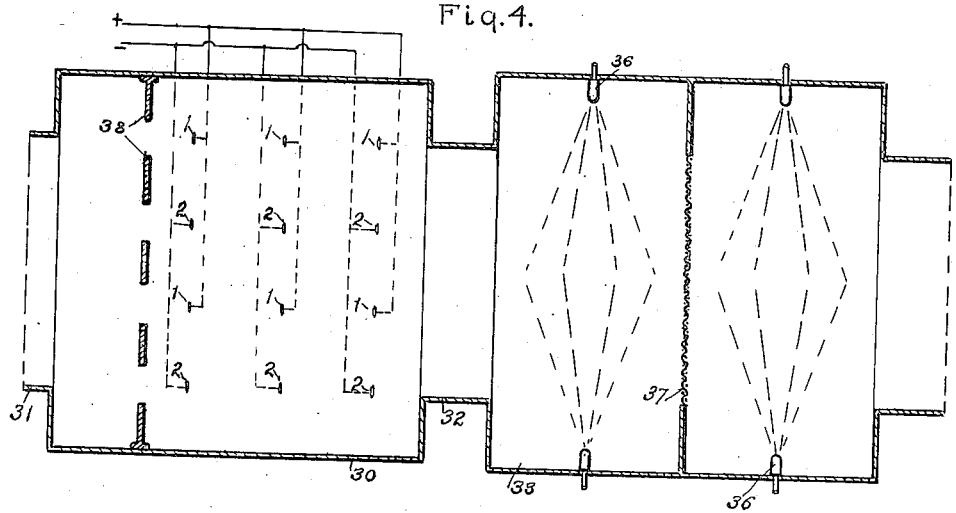
Fig. 4 is a horizontal section of another form of the invention.

Referring to Fig. 1, the apparatus therein shown comprises a plurality of discharge electrodes which may be of any suitable configuration, adapted to produce electrical discharge, said electrodes being, for example, provided with sharp edges, as shown. Certain of said electrodes, indicated at 1, may be conected to suitable current supply means so as to present a high positive potential and other of said discharge electrodes, indicated at 2, may be connected to said current supply means so as to present a high negative potential, the potential difference between the positive electrodes 1 and negative electrodes 2 being sufficient to cause an intense electrical field adjacent to each of said electrodes so as to cause electrical discharge from said electrodes; the discharge from electrodes 1 being positive and the discharge from electrodes 2 being negative.

The gas is caused to flow past said electrodes, (for example, within a conduit or chamber 3), in the direction indicated by arrows, with the result that the suspended particles carried by said gas (for example, dust or fume particles) receive electrical discharge charges by reason of the electrical discharge emanating from the respective electrodes 1 and 2, some of the suspended particles receiving positive charges and others of the suspended particles receiving negative charges. Under the action of the electrical field the positively and negatively charged particles are forced to migrate toward each other and thereby brought into contact or proximity. There is, furthermore, a tendency by reason of the electrostatic attraction for the oppositely charged particles to approach and coalesce or adhere to one another forming larger particles or aggregates. These larger particles or aggregates are more susceptible to gravitative action and can, therefore, be separated from the gases by settling operation. For the sake of compactness, I prefer to provide for such settling action in the same apparatus which provides for agglomeration, and, for this purpose, as well as for directing the gases into contact with the discharge electrodes, there are provided in the path of the gases flowing through the apparatus one or more series or rows of baffles or obstructions 4, which may be of non-conducting material, or which may be of conducting material and grounded, as indicated at 5.

With reference to the diagrammatical illustration of my invention shown in Fig. 1, the same being a horizontal section, it will be understood that the discharge electrodes 1 and 2 shown therein will be elongated in a vertical direction being, for example, in the form of thin vertical strips placed flat-wise in a plane transverse to the flow of the gas; and the baffle, or obstructing means, will also be elongated vertically and placed transversely to the direction of the gas flow in planes in advance and in rear of the respective sets of discharge electrodes 1 and 2. The zones in which the positively charged suspended particles meet and coalesce are intermediate the opposing electrodes 1 and 2 of each set and the obstructing or baffle means 4 are preferably placed in line with such zones (that is to say, intermediate between the rows of positive electrodes 1 and the rows of negative electrodes 2) with reference to the direction of flow of the gas.

Referring to Figs. 2 and 3, showing an embodiment of my invention; the same comprises a casing or chamber 6 connected at one end to an inlet 11 and at its other end to an outlet 11' so as to conduct the gases to be treated through such chamber; and two series of discharge electrodes 1 and 2 mounted within said chamber on insulated supports 7 and 8, respectively. These insulated supports 7 and 8 are mounted on insulators 9 in a header 10 formed as an enlargement at the top of the chamber 6. For convenience in construction, the insulated supports 7 may be formed as I-beams, there being an upper set of beams 7 with the cross-bars 7' extending between same and a lower set of beams 8 with cross-bars 8' extending between same, the discharge electrodes 1 being hung from upper cross-bars 7' and discharge electrodes 2 being hung from lower cross-bars 8'. Any suitable construction may, however, be used for mounting the discharge electrodes.

Baffles or obstructing bars 4 are hung from the top of the header 10 and extend downwardly between the successive cross-bars 7' and 8' so as to be intermediate the successive rows of discharge electrodes 1 and 2, such location of the baffles between the rows of discharge electrodes ensuring deflection of the gases into contact with the electrodes and also being of advantage in that the baffles are in position for obstructing and intercepting gas and the coalesced particles or flakes carried thereby and produced in the agglomerating zones between the positive and negative electrodes, and for producing quiescent zones in front of said baffles, in which zones the agglomerated particles are free to settle by gravitative action. Chamber 6 is provided at its bottom with a pin 12 for receiving the settled material and with a gate 13, or other means for withdrawing such material from the bin. The sets of discharge electrodes 1 and 2 above described are arranged in opposition in rows intercepting the gas stream, alternate electrodes being charged with electricity of opposite polarity and forming a multiplicity of pairs of opposing positive and negative discharge electrodes, and the obstructing bars 4 are arranged to form a multiplicity of obstructing means intermediate successive rows of discharge electrodes and in the path of the gases passing through the respective discharge zones.

In order to charge the positive and negative electrodes, the insulated supports 7 and 8 therefor may be connected, respectively, by wires 14 and 15 to shoes 16 and 17 of a rectifier 19, said rectifier comprising two other stationary shoes 20 and 21 connected by wire 22 to the high tension coil of a step-up transformer 23, said coil having a ground connection 24 and the primary winding of said coil being connected to alternating current supply circuit wires 25 and 26. The rectifier 19 may be of any suitable type, being herein shown as comprising an insulating disc 27 mounted to rotate on the shaft 28, which is operated in synchronism with the alternating supply current, said disc carrying a cross-connector 29 connecting diametrically opposite terminals 18 and 18' so that in the rotation of the disc said cross-connector establishes connection, first, between the stationary shoes 21 and 17, and then between the stationary shoes 20 and 16, in such manner that connection is made through shoes 20 and 16 and wire 14 to the electrodes 7 at that part of the current wave when wire 22 is at a high positive potential and connection is made through shoes 21 and 17 and wire 15 to the electrodes 8 when the wire 22 is at high negative potential, contact in each instance being maintained throughout a sufficient portion of the wave to effect the desired operation. Shaft 28 may be operated by the shaft of a synchronous motor or an alternating current generator connected to the circuit 25—26.

My process may be carried out in the above described apparatus as follows:

The gas passes through the chamber 6 and is deflected by the baffles 4 in such manner that substantially all of the gas passes adjacent to the discharge electrodes 1 and 2. Such discharge electrodes are maintained at sufficiently high potential difference to cause silent electrical or corona discharge from each of said electrodes, the discharge from electrodes 1 being, for example, positive and that from electrodes 2 being negative. A potential difference of 100,000 volts or over is generally sufficient for the purpose, the electrodes 1 being, for example, at a positive potential of 50,000 volts and electrodes 2 being maintained at a negative potential of about 50,000 volts. Or, if desired, either of the sets of discharge electrodes may be grounded and the other set maintained at a sufficiently high potential, either positive or negative, to establish the required potential difference. Under these conditions, the suspended particles in the gas flowing by and between the first set of electrodes 1 and 2 become electrically charged, the particles adjacent to electrode 1 being positively charged and the particles adjacent to electrode 2 being negatively charged and these oppositely charged particles are forced toward one another by the action of the electrical forces with the result that they eventually cohere or coalesce to form larger particles or flakes. This operation is repeated as the gases pass between the two sets of discharge electrodes and so on for as many successive operations as may be necessary to effect agglomeration of substantially all of the suspended material or as much thereof as is considered desirable. The agglomerated particles or flakes may be removed from the gas by gravitative or other action dependent on the mass of the particles and such gravitative separation of the particles is facilitated by the inter-position of the obstructing means or baffles 4, which form zones, indicated at $b$, where the velocity of the gas is at a minimum and wherein the agglomerated particles or flakes are free to settle by gravitative action. Such of the particles or flakes as actually reach these baffles and adhere thereto may be dislodged by shaking, knocking, scraping or washing the baffles. In order to provide for more effective pocketing of the gas at such baffles and to increase the quiescence of the gas in the zones adjacent thereto, said baffles, as shown in Figs. 2 and 3, may be formed as channel or I-beams. The same effect may also be produced by enlarging the edge portions of said baffles, as shown in Fig. 1, such enlargements also serving to minimize the electrical field intensity at such parts, due, for example, to induction from the respective high potential electrodes 1 and 2. In any case, it is preferred to make these baffles of non-conducting material or to ground the same if they are made of conducting material, so that they will be substantially neutral as regards the electro-static field.

In the above described operation, the suspended particles in the gases are forced toward one another primarily by the action of the electrical fields adjacent to the respective discharge electrodes, the positively charged particles being forced away from the positive electrode towards the negative electrode and the negatively charged particles being forced away from the negative electrode toward the positive electrode, with the result that the oppositely charged particles are brought into contact or at least into approximation with a rapidity that is far in excess of that which would be due to the attraction of the particles themselves. Such attraction, however, contributes to the operation and is especially effective in completing the coalescence or contact of the particles when they are in proximity with one another.

While I have described my invention as carried out in an apparatus wherein the agglomeration or coalescence of the suspended particles and the subsequent settling thereof is effected in the same chamber, the invention may also be carried out in such manner that the settling of the agglomerated particles is effected in a separate chamber connected to receive the gases passing through the agglomerating chamber. Such an embodiment of my invention is shown in Fig. 4, wherein the series of electrodes 1 and 2 are mounted in a chamber 30 which is connected to receive the gases to be treated through an inlet conduit 31 and has an outlet conduit 32 through which the gases pass to a settling chamber 33. Said settling chamber may depend for its operation upon the action of gravity alone or, if desired, water sprays, as indicated at 36, may be used for increasing the separating action. On account of the large size of the agglomerated particles they are susceptible to the various methods of separation such as are well known in the art, for example, filtration means, such as screens or filters of relatively coarse texture may be employed, as indicated at 37. Baffle means 38 are preferably provided for distributing the gases.

What I claim is:

1. Apparatus for removing suspended particles from gases, comprising a treater chamber and means for conducting a stream of gases to be treated therethrough, two electrodes in the chamber, each having a small superficial area and construcetd to produce a zone discharge to effect agglomeration of the suspended particles, said electrodes being connected to the opposite poles of a source of high tension current and means in the chamber operative to establish in the gas stream zones of relative quiet.

2. Apparatus for removing suspended particles from gases, comprising a treater chamber forming a passage for the gas to be treated, two electrodes in the chamber, each having a small superficial area and constructed to produce a zone discharge, the electrodes being connected to the opposite poles of a source of high-tension current and positioned to produce contiguous discharge zones in the flow of the gases and vertically extending obstructing means defining zones of relative quiet adjacent said discharge zones.

3. In apparatus for removing suspended particles from gases, means defining a passage for a gas stream, a discharge electrode having a small superficial area and connected to one pole of a source of high-tension current a second discharge electrode having a small superficial area and connected to the opposite pole of said source, said electrodes being disposed to produce contiguous discharge zones in the path of the gases, and vertically extending baffle means adjacent the said zones of discharge intermediate the electrodes defining a zone of relative quiet in the gas stream.

4. In apparatus for removing suspended particles from gases, means defining a passage for a gas stream, a plurality of discharge electrodes of small superficial area connected to one pole of a source of high-tension current and a plurality of discharge electrodes of small superficial area connected to the opposite pole of said source, said electrodes being disposed to produce pairs of contiguous discharge zones of opposite polarity in the flow of the gases and obstructing means in the path of the gas stream adjacent the said zones operative to establish zones of relative quiet.

5. In apparatus for removing suspended particles from gases, means defining a passage for a gas stream, a plurality of discharge electrodes of small superficial area connected to one pole of a source of high-tension current, a plurality of discharge electrodes of small superficial area connected to the opposite pole of said source, said electrodes being disposed to produce pairs of contiguous discharge zones of opposite polarity in the gas flow, and adapted to cause agglomeration of suspended particles in the gas stream passing through such discharge zones, and obstructions in the gas flow positioned to guide the gas into proximity to the discharge electrodes and to produce quiescent zones in which such agglomerated particles may settle, such obstructions being of electrically non-conducting material.

6. In apparatus for removing suspended particles from gases, means defining a passage for a gas stream, a plurality of discharge electrodes of small superficial area connected to one pole of a source of high-tension current, a plurality of discharge electrodes of small superficial area connected to the opposite pole of said source, said electrodes being disposed to produce pairs of contiguous discharge zones of opposite polarity intercepting the gas flow, and obstructions in the gas flow positioned to guide the gas into proximity to the discharge electrodes, and to define intermediate each pair of oppositely charged electrodes zones of relative quiet in the gas stream.

7. An apparatus for removing suspended material from gases, comprising a treater chamber, vertically extending electrodes arranged in the chamber in a plurality of rows in the gas flow and means for charging the electrodes in alternate rows with electricity of opposite polarity.

8. Apparatus for removing suspended particles from gases, comprising a treater chamber defining a gas passage, a multiplicity of electrodes for discharging electricity of both positive and negative polarity and a multiplicity of shields interposed between the various electrodes producing zones of relative quiet in the gas stream.

9. Apparatus for removing suspended particles from gases comprising a treater chamber defining a gas passage, a multiplicity of electrodes of small superficial area for discharging electricity of one polarity, a multiplicity of electrodes of small superficial area for discharging electricity of opposite polarity and a multiplicity of shields interposed between the various electrodes producing zones of relative quiet in the gas stream.

10. An apparatus for removing suspended material from gases, comprising a horizontally extending chamber provided with means for passing the gases therethrough, vertically extending discharge electrodes insulated and maintained at high potential and arranged in said chamber in opposition in successive transverse rows, so as to cause the gas to pass successively through successive rows of electrodes.

In testimony whereof I have hereunto subscribed my name this 4th day of November, 1918.

WALTER A. SCHMIDT.